United States Patent

Benjamin et al.

[15] 3,658,434
[45] Apr. 25, 1972

[54] ANTI-CHATTER GUIDES FOR SPADE DRILL

[72] Inventors: Milton L. Benjamin; David D. Walker, both of Chagrin Falls, Ohio

[73] Assignee: Erickson Tool Company, Solon, Ohio

[22] Filed: Apr. 3, 1970

[21] Appl. No.: 25,382

[52] U.S. Cl..............................408/200, 408/83, 408/114, 408/239
[51] Int. Cl..........................................B23b 51/00
[58] Field of Search....................408/83, 113, 114, 200, 211, 408/239

[56] References Cited

UNITED STATES PATENTS 552,065  12/1895  King.......................................408/200

Primary Examiner—Francis S. Husar
Attorney—Oberlin, Maky, Donnelly & Renner

[57] ABSTRACT

Anti-chatter guides for a spade drill which are perpendicular to the side faces of the spade blade and which have an end to end dimension (diameter) wholly forwardly of the rear portion of the blade corresponding to the width of the blade so as to engage the wall of the hole drilled by the blade thus to prevent chatter of the spade drill during drilling and after the cutting edges break through the workpiece. In one form of the invention, the guides constitute a portion of the clamping means by which the spade blade is mounted in the slotted end of a holder, and in another form of the invention, the guides are on the blade itself forwardly of the holder.

6 Claims, 4 Drawing Figures

PATENTED APR 25 1972
3,658,434
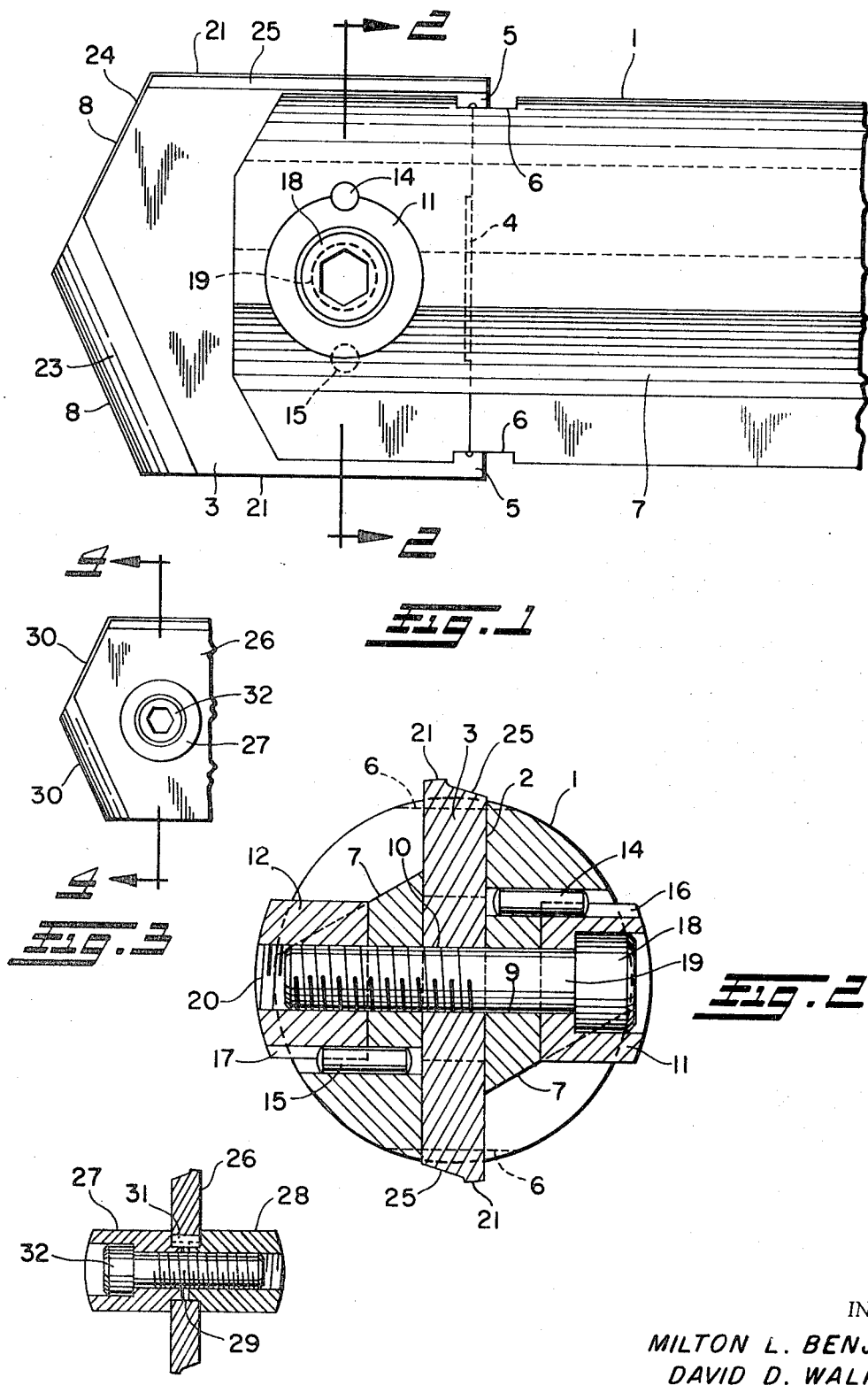
INVENTORS
MILTON L. BENJAMIN
DAVID D. WALKER
BY
Oberlin, Maky, Donnelly & Renner
ATTORNEYS

3,658,434

ANTI-CHATTER GUIDES FOR SPADE DRILL

BACKGROUND OF THE INVENTION

As shown in the Milton L. Benjamin et al. U. S. Pat. Nos. 3,049,033, 3,076,357, and 3,364,800, spade drills generally comprise a flat blade having cutting edges at one end and having a hole therethrough adjacent the rear end through which a screw extends for clamping the blade in the slotted end of a holder, the holder usually having a shank for mounting the holder in a machine tool spindle, in a lathe turret or the like. From the last-mentioned patent it is known to provide carbide or like guide buttons mounted in the holder rearwardly adjacent the rear end of the blade. However, if the axial length of the blade exceeds the thickness of the workpiece, the cutting edges of the blade may break through the workpiece before the guide buttons of U.S. Pat. No. 3,364,800 enter the drilled hole, whereby they are not effective to reduce chatter until after the axially rear portion of the blade has entered the hole.

SUMMARY OF THE INVENTION

Contrary to the foregoing, the anti-chatter guides herein are secured in a hole in the blade which is forward of the rear end thereof, thus to become effective to reduce chatter during the drilling operation and when the cutting edges break through the workpiece.

Furthermore, the anti-chatter guides herein are secured against relative rotation with respect to the hole in the blade so that the outer ends of the guides may have the same shape as the hole being drilled without possibility of skewing of the end surfaces of the guides.

The anti-chatter guides herein also constitute a portion of the clamping means by which the blade is secured in the holder.

Other objects and advantages of the present invention will appear hereinafter.

BRIEF DESCRIPTION OF THE DRAWING

FIG. 1 is a side elevation view of the end portion of a spade drill blade holder with a blade clamped therein;

FIG. 2 is a cross-section view taken substantially along the line 2—2, FIG. 1;

FIG. 3 is a fragmentary side elevation view of the front end portion of a modified form of blade embodying the present invention; and FIG. 4 is a cross-section view taken substantially along line 4—4, FIG. 3.

DETAILED DESCRIPTION OF THE INVENTION

As shown in FIGS. 1 and 2, the end of the holder 1 has a diametrical slot 2 which is of width corresponding to the thickness of the blade 3 adapted to be mounted therein in seated engagement against the bottom 4 of the slot 2 with axial portions 5 of the blade 3 overlapping flat portions 6 of the holder 1 thus to align the blade 3 and holder 1 axes. The holder 1 is formed with flutes 7 which extend longitudinally for travel of chips away from the cutting edges 8 of the blade 3. As shown in the aforesaid Milton L. Benjamin et al. patents, the holder 1 will be provided with a suitable shank at its rear end (not shown herein) for connection with a machine tool spindle or with a lathe turret or the like.

The slotted end of the holder 1 has a hole 9 therethrough perpendicular to the slot 2 which registers with the hole 10 of the blade 3, the hole 9 being counterbored at its opposite ends to receive anti-chatter guides 11 and 12 therein, the guides 11 and 12 being keyed against rotation as by means of cylindrical pins 14 and 15 which are press-fitted into the holder 1 and which extend into semi-circular axial grooves 16 and 17 of the respective guides 11 and 12. One guide 11 is counter bored to receive the head 18 of a clamping screw 19 and the other guide 12 is threaded at 20 for threaded engagement with the screw 19. Accordingly, when the screw 19 is tightened, the guides 11 and 12 are firmly seated in the holder 1 and the slotted end of the holder 1 is caused to tightly frictionally clamp the blade 3 therein.

In the case of the drilling of a round hole in a workpiece, the outer ends of the guides 11 and 12 are cylindrical and are of the same diameter as the width of the blade which preferably has cylinder ground opposite sides 21.

The blade 3 herein shown is of conventional form having cutting edges 8 provided with top rake grooves 23 and having relief 24 on the cutting edges 8. The sides of the blade 3 are as aforesaid preferably cylinder ground as at 21 with relief 25.

Referring now to FIGS. 3 and 4, the blade 26 has anti-chatter guides 27 and 28 in lieu of, or in addition to, the guides 11 and 12 shown in FIGS. 1 and 2. The guides 27 and 28 are piloted in the hole 29 in the front end portion of the blade 26 just behind the cutting edges 30 and are held against rotation with respect to the blade 26 and with respect to each other as by means of the key 31 engaged in keyways formed in the respective guides 27 and 28 and in the hole 29. Clamping of the guides 27 and 28 to the blade 26 is effected by a screw 32 having its head engaged in a counterbore in one guide 27 and having threaded engagement with the other guide 28. As in the case of the blade 3 and guides 11 and 12, the sides of the blade 26 and the outer ends of the guides 27 and 28 are cylinder ground whereby the guides 27 and 28 prevent chatter of the blade 26 as when the cutting edges 30 break through a workpiece.

We, therefore, particularly point out and distinctly claim as our invention:

1. A spade drill comprising a holder having an axial slot diametrically across one end; a blade in said slot having cutting edges axially beyond the end of said holder, and diametrically opposite axial side faces to guide said drill into the hole formed by said cutting edges as said drill and a workpiece are relatively rotated and fed axially; diametrically opposite anti-chatter guide means on said holder disposed perpendicular to said slot and blade and having a diametrical end-to-end dimension substantially equal to the distance between said side faces to further guide said drill and to substantially eliminate chatter of said drill; and screw means operative to secure said anti-chatter guide means to said holder and to clamp said blade in said slot; said screw means comprising a screw extending through registering holes in said holder and said blade, said screw having a head engaging one of said guide means and having threaded engagement with the other of said guide means.

2. The spade drill of claim 1 wherein the hole in said holder is counterbored at its ends to receive therein the respective guide means.

3. The spade drill of claim 2 wherein said one guide means is counterbored to receive the head of said screw therein.

4. The spade drill of claim 2 wherein key means in said counterbores are engaged with the respective guide means to retain them from rotation relative to each other and to said holder about the axis of the hole in said holder.

5. A spade drill comprising a holder having an axial slot diametrically across one end; a blade in said slot having cutting edges axially beyond the end of said holder, and diametrically opposite axial side faces to guide said drill into the hole formed by said cutting edges as said drill and a workpiece are relatively rotated and fed axially; diametrically opposite anti-chatter guide means disposed perpendicular to said blade and having a diametrical end to end dimension substantially equal to the distance between said side faces to further guide said drill and to substantially eliminate chatter of said drill; screw means operative to clamp said blade in said slot; the ends of said guide means being disposed entirely within the axial extent of said side faces of said blade; key means retaining said guide means against rotation with respect to each other and with respect to said blade; and additional screw means operative to retain said guide means on said blade forwardly of the slotted end of said holder.

6. The spade drill of claim 5 wherein said guide means are piloted in a hole in said blade forwardly of the slotted end of said holder; and wherein said additional screw means bears on one of said guide means and extends through the hole in said blade and has threaded engagement with the other one of said guide means thus to clamp said guide means to said blade.

* * * * *